United States Patent [19]
Heidenreich et al.

[11] Patent Number: 5,135,088
[45] Date of Patent: Aug. 4, 1992

[54] COMPACT TORQUE LIMITING CLUTCH

[75] Inventors: David C. Heidenreich, Akron; Keith A. Nichols, North Canton, both of Ohio

[73] Assignee: Power Transmission Technology, Inc., Sharon Center, Ohio

[21] Appl. No.: 732,096

[22] Filed: Jul. 18, 1991

[51] Int. Cl.⁵ ............................................. F16D 7/02
[52] U.S. Cl. ................................. 192/56 R; 464/48
[58] Field of Search ............ 464/48; 192/56 U, 114 R

[56] References Cited

U.S. PATENT DOCUMENTS

| 1,505,480 | 8/1924 | Manville | 464/48 |
| 3,984,999 | 10/1976 | Kopp | 192/56 R X |
| 4,401,426 | 8/1983 | Heidenreich | 464/48 X |
| 4,464,137 | 8/1984 | Jennings | 464/48 |
| 4,645,472 | 2/1987 | Heidenreich | 464/48 |
| 4,661,083 | 4/1987 | Heidenreich | 464/48 X |

FOREIGN PATENT DOCUMENTS

| 696160 | 12/1930 | France | 464/48 |
| 274568 | 6/1970 | U.S.S.R. | 464/48 |
| 376017 | 7/1932 | United Kingdom | 464/48 |
| 574589 | 1/1946 | United Kingdom | 464/48 |
| 2056589 | 3/1981 | United Kingdom | 192/56 R |

Primary Examiner—Leslie A. Braun
Assistant Examiner—Nicholas Whitelaw
Attorney, Agent, or Firm—Renner, Kenner, Greive, Bobak, Taylor & Weber

[57] ABSTRACT

A compact torque limiting clutch provides spring cup bolt assemblies for interengaging a pressure plate and input plate and input flange on opposite sides of a friction flange of an output hub. The spring cup assemblies include bolts employed for securing the clutch elements together, such bolts being restricted from rotating during the assembly process by engagement with noncircular apertures passing through the retainer plate. The torque limiting clutch is of a pancake design, contained between axially displaced planar surfaces defined by an input flange on one side and a pressure plate on the other.

16 Claims, 1 Drawing Sheet

COMPACT TORQUE LIMITING CLUTCH

TECHNICAL FIELD

The invention herein resides in the art of torque limiting clutches of the friction type. More particularly, the invention relates to a compact torque limiting clutch adapted to interconnect input and output power sources through a friction media having a characteristic break-away torque.

BACKGROUND ART

The use of torque limiting clutches to couple drive and driven members is well known. In industries requiring such torque limiting clutches, it is well known that the same are designed or selected for specific applications. Each torque limiting clutch typically has a characteristic break-away torque. By employing a torque limiting clutch with a break-away torque which is lower than that at which damage can be done to the drive or driven members, the torque limiting clutch serves to protect the system in which it is employed.

Previously, it has been known to use spring bolts, spring pins and/or spring cups in torque limiting clutches as a force generating means. Such spring bolt assemblies are shown in U.S. Pat. No. 4,401,426, such spring pin assemblies are shown in U.S. Pat. No. 4,645,472, and the spring cup assemblies of a similar nature are shown in U.S. Pat. No. 4,661,083. It is now readily appreciated by those skilled in the art that such spring bolt assemblies, spring pin assemblies, and spring cup assemblies provide for ease of assembly of torque limiting clutches. They further significantly preclude tampering with the assembled clutch, and provide substantially consistent characteristic break-away torque over the useful life of the clutch.

Despite the compact nature of the spring cups, spring pins, and spring bolts, torque limiting clutches are necessarily of substantial physical size, particularly length. This size results from the necessary inclusion of input and output coupling members, a pressure plate, spring or other force members, and the requisite number of friction elements. The physical size constraints placed on many systems otherwise requiring torque protection often preclude the implementation of torque limiting clutches therein.

It is well known in the art that the size of many torque limiting clutches is often dictated by the assembly techniques employed in their manufacturer, such assembly requiring access areas to nuts, bolts, and the like during the assembly process. When such nuts and bolts are interior to the torque limiting clutch, access openings and clearances must be provided within the clutch to accommodate the assembly process. These areas and openings necessarily aggravate the size considerations given in the design of such torque limiters.

It is further known that the size of a torque limiting clutch is greatly impacted by the nature of the input and output hubs employed for the coupling of drive and driven members thereto. In many known torque limiting clutches, the axial size of the clutch, measured axially from one extreme to the other, has been found to be excessive.

There is a need in the art for a compact torque limiting clutch of minimal axial dimensions and in which its assembly is easily achieved without the need of access to the internal structure of the assembly.

DISCLOSURE OF INVENTION

In light of the foregoing, it is a first aspect of the invention to provide a torque limiting clutch which may be assembled and disassembled without internal access to the clutch.

Another aspect of the invention is the provision of a torque limiting clutch which is compact in design.

Yet another aspect of the invention is the provision of a torque limiting clutch which is substantially flat, contained axially between pairs of parallel planar surfaces.

An additional aspect of the invention is the provision of a torque limiting clutch wherein the input and output hubs are nested within each other.

Yet another aspect of the invention is the provision of a torque limiting clutch which is reliable and durable in construction and operation, while being conducive to implementation with state of the art apparatus and techniques.

The foregoing and other aspects of the invention which will become apparent as the detailed description proceeds are achieved by a torque limiting clutch, comprising: an input flange; and output hub in forceful frictional engagement with said input flange; a pressure plate; and force generating means operatively interposed between said pressure plate and input flange for urging said output hub into said forceful frictional engagement with said input flange.

Additional aspects of the invention are attained by a torque limiting clutch, comprising: an input flange; an output hub; a pressure plate; a spring and bolt assembly interengaging said input flange, output hub, and pressure plate in forceful frictional engagement; and means of engaging said bolt of said spring bolt assembly for preventing rotational movement of said bolt.

DESCRIPTION OF DRAWING

For a complete understanding of the objects, techniques and structure of the invention reference should be made to the following detailed description and accompanying drawing wherein.

BEST MODE FOR CARRYING OUT THE INVENTION

Figure 1:
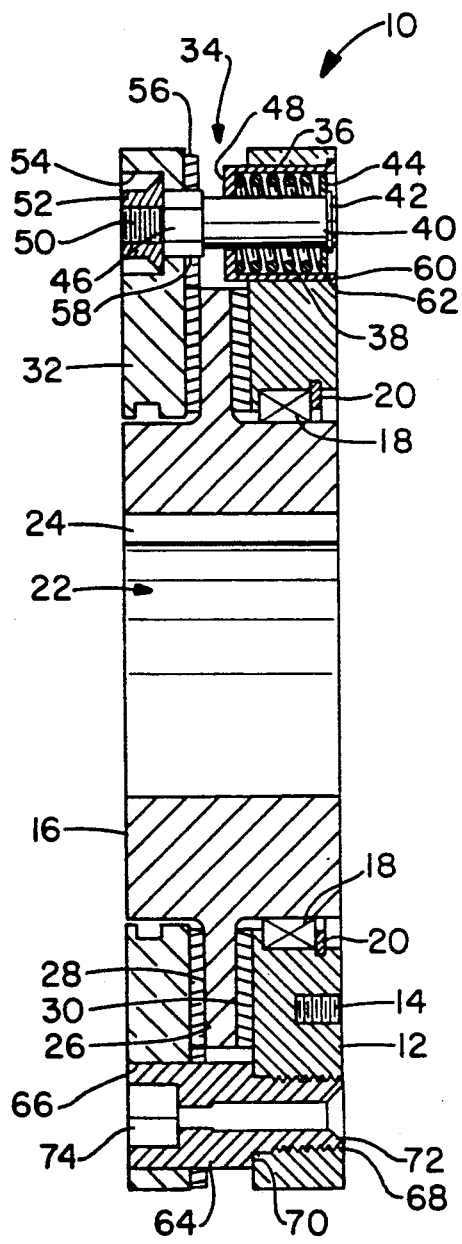
FIG. 1 is a cross sectional view of a compact torque limiting clutch according to a first embodiment of the invention.

Referring now to the drawing and more particularly FIG. 1, it can be seen that a torque limiting clutch according to a first embodiment of the invention is designated generally by the numeral 10. The clutch 10 employs an input flange or ring 12 having a plurality of threaded bores 14 uniformly and radially spaced thereabout to receive a coupler or other appropriate input power source such as a pulley or sprocket. The input flange 12 is received upon an output hub with a bearing 18 interposed therebetween, allowing for relative rotational movement between the input flange 12 and output hub 16. The bearing 18 is maintained in position by means of a keeper ring 20 received within the opening of the input flange 12.

A bore 22 passes axially through the output hub 16 and is adapted for receiving an appropriate shaft or the like of a driven member. A key way 24 is provided within the output hub 16 and in communication with the bore 22 for purposes of receiving a key or spline of the mating shaft.

A flange or ring 26 extends radially from and circumferentially about the output hub 16 and has friction material affixed to opposite faces 28, 30 thereof. A pressure plate 32 is received upon the output hub 16 on a side of the flange 26 opposite the input flange 12.

Spaced about the periphery of the assembly 10 are a plurality of spring cup bolt assemblies 34 which are interengaged between the input hub 12 and pressure plate 32. As will be appreciated by those skilled in the art, the spring cup bolt assemblies 34 urge the pressure plate 32 and input flange 12 toward each other and forcefully against respective friction surfaces 28, 30 of the friction flange 26 of the output hub 16. As will be appreciated by those skilled in the art, the magnitude of the forceful engagement, considered in light of the nature of the friction material of the faces 28, 30, determines the characteristic break-away torque of the clutch 10.

Each of the spring cup bolt assemblies 34 includes a cup or can 36 receiving and containing a spring 38 therein. A bolt 40 passes through an opening within an end cap 48 of the cup 36. At one end of the bolt 40 a washer 44 is maintained by a retaining ring 42. The washer 44 provides a precompressed moveable closure at an external end of the cup 36, engaging the spring 38 and compressing the same against the cap 48 in a manner understood by those skilled in the art to establish a pretested color verified spring force characteristic of the cup assembly 34. While the bolt 40 is substantially of a cylindrical nature, it will be appreciated that a shoulder 46 is provided thereon abutting the end cap 48 of the cup 36 prior to installation and at wear-out. The bolt 40 further has a threaded head 50 adapted to receive a flange nut 52 within a counter bore 54 of the pressure plate 32 at assembly. A retainer plate 56, provided in the form of a ring in the embodiment of FIG. 1, is positioned adjacent the pressure plate 32, having openings 58 passing therethrough for receiving the shoulder 46 of the bolts 40. The openings 58 are of substantially the same geometry as the cross sectional geometry of the shoulder 46. With this geometry being non-circular, and preferably hexagonal, the shoulder 46 mates with the opening 58, with such opening precluding any rotational movement of the bolt 40. The desirability of this feature will become apparent hereinbelow with respect to the assembly technique of the clutch 10.

The cup 36 is provided with a ring flange 60 which is received within a circumferential groove 62 about the bore of the input flange 12 provided for receiving the cup assembly 34. The recessed groove 62 assures that the spring cup bolt assembly 34 does not extend beyond the axially exterior planar surface of the input flange 12.

Torque pins 64 may be provided in circumferentially and radially spaced relationship about the outer edge of the torque limiting clutch 10 as shown. Each torque pin 64 is received within a bore 66 passing through the pressure plate 32 and is threadedly engaged as at 68 into the input flange 12. The shoulder 70 of the torque pin 64 engages and abuts the inner surface of the input flange 12. In the preferred embodiment of the invention, the end 72 of the torque pin 64 is substantially flush with, or recessed with respect to, the axially external surface of the input flange 12. A hexhead 74 or other appropriate drive means is provided in one end of the pin 64 for allowing the making of the threaded engagement 68. Those skilled in the art will readily understand that the torque pins 64 are adapted to assure rotational interengagement between the pressure plate 32 and input hub 12.

In the assembly of the torque limiting clutch 10, it will be appreciated that the input flange 12 and pressure plate 32 are placed over axially opposite ends of the output hub 16, with the bearing 18 properly interposed between the input flange 12 and output hub 16 as retained by the keeper ring 20. A spring cup bolt assembly 34 is then inserted into the appropriate bore or bores spaced about the peripheral outer edge of the input flange 12. At this point, the spring 38 is precompressed an amount determined by the spring extension allowed by the position of the washer 44 when the shoulder 46 abuts the cap 48. The shoulder 46 is passed through the corresponding opening 58 in the retainer plate or ring 56 such that the threaded head 50 is then present within the counterbore 54 of the pressure plate 32. The flange nut 52 is then threaded onto the threaded head 50 of the bolt 40 until it bottoms against the bottom of the bore 54 and the top edge of the shoulder 46. This tightening process draws the pressure plate 32, input flange 12, and friction flange 26, 28, 30 into forceful engagement with each other and provides for additional compression of the spring 38 within the can 36. While the nut 52 is being tightened, the bolt 40 is restrained from any rotational movement by virtue of the mating engagement of the shoulder 46 with the corresponding opening 58 of the retaining plate 56. The spring 38 is further compressed between the cap 48 and washer 44 as the nut 52 is tightened. The tightening draws the shoulder 46 from the cap 48 a distance equal to the wear thickness of the wear surfaces of the clutch 10. As the clutch wears, the cap 48 will move toward the shoulder 46 and will abut each other when the clutch is fully worn.

It will be appreciated that the number and color-designated force of the spring cup bolt assemblies 34 which are employed will determine the characteristic break-away torque of the torque limiting clutch 10. Additionally, it will be appreciated that the clutch assembly 10 is of a "pancake" design, with all of the operative structure thereof being contained between the exterior planar surfaces defined by the input flange 12 and the pressure plate 32. In the preferred embodiment shown, the total maximum axial dimension of the torque limiting clutch 10 is equivalent to the axial dimension of the output hub 16.

It will, of course, be appreciated that so long as the torque applied to the clutch 10 is below the characteristic break-away torque, the output hub 16 will rotate directly with the input flange 12. When that torque is exceeded, the pressure plate 32 and input flange 12 will rotate upon the output hub 16 and relative thereto.

Figure 2:
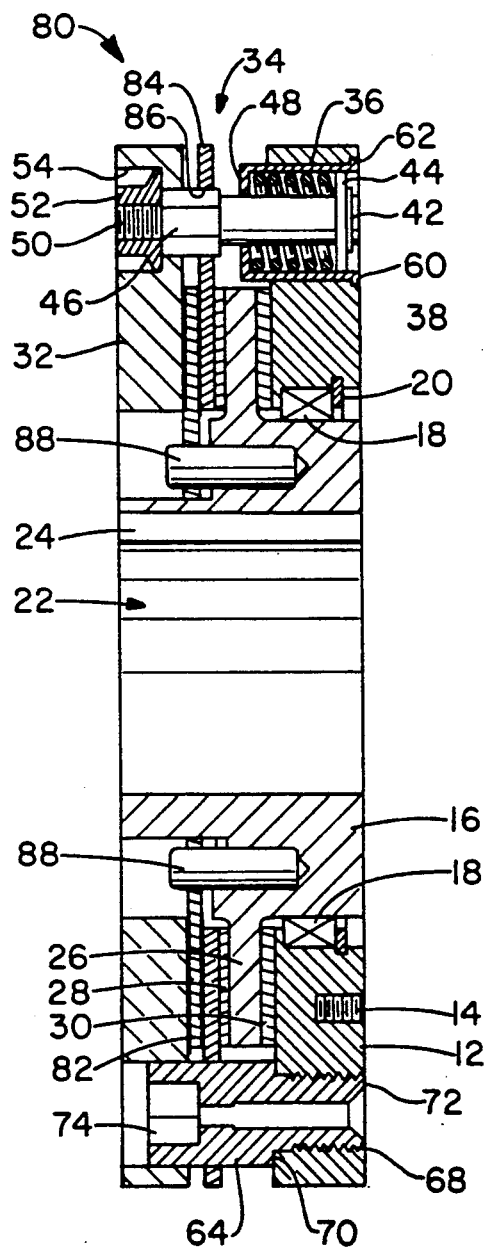
FIG. 2 is a cross sectional view of a compact torque limiting clutch according to a second embodiment of the invention.

Another embodiment of the invention is shown in FIG. 2, wherein a torque limiting clutch is designated generally by the numeral 80. In this embodiment, those elements corresponding to the elements of the torque limiting clutch 10 of FIG. 1 are designated by like numerals. Accordingly, it will be seen that an input flange 12 is received upon an output hub 16 through a bearing 18. As in FIG. 1, a pressure plate 32 and the input flange 12 are urged toward each other by spring cup assemblies 34. In this embodiment, however, to increase the characteristic break-away torque of the clutch 80, a friction disc 82, having a friction material on each side thereof, is interposed between the pressure plate 32 and the retainer plate 84. In this embodiment, the retainer plate 84 also operates as a separator plate between the friction disc 82 and the friction surface 28 of the flange 26. As in the clutch assembly of FIG. 1, the retainer plate 84 has openings 86 therein which are of similar geometry to the non-circular cross sectional geometry of the shoulder 46 of the bolt 40. Accordingly, the bolts 40 are prevented from rotating by the mating engagement of the openings 86 with the respective shoulders 46 during the assembly process.

It will also be noted that the assembly 80 of FIG. 2 also includes pins 88 passing through the friction disc 82 and into the output hub 16 to prevent rotational movement of the friction disc 82 independent of the output hub 16, while allowing axial movement. Of course, splines or keys could also be employed for such purposes.

It should now be appreciated that the torque limiting clutch 80 of FIG. 2 provides forceful frictional engagement at the interface of the friction disc 82 with the pressure plate 32, at the interface of the friction disc 82 with the retainer plate/separator plate 84, at the interface of the retainer plate/separator plate 84 and the friction surface 28, and at the interface of the friction surface 30 with the input flange 12. The characteristic break away torque is, accordingly, a function of these frictional interfaces and the number and character of spring cup assemblies 34 employed.

It will be appreciated by those skilled in the art that the assembly and operation of the torque limiting clutch 80 is, in most respects, similar to that of the clutch 10, described above. Again, the clutch 80 is of a "pancake" design, contained between the axially displaced external planar surfaces of the input flange 12 and the pressure plate 32. Additionally, during the assembly and disassembly of the clutches 10, 80 there is no need for access of any tools or the like internally of the clutch assembly. The bolts 40 are restricted from rotating by means of the respective retainer plates 56, 84.

It is further contemplated that the torque limiting clutches of the invention may be modified from the specific embodiments disclosed. The invention anticipates that the retainer plates 56, 84 may, if desired, be mounted external to the pressure plate 32, in which case the nuts 52 would tighten against the retainer plates. Additionally, the retainer plates 56, 84 may be eliminated or made integral with the pressure plate 32. It is contemplated that the bores of the pressure plate which receive the shoulders 46 of the bolt 40 may have a geometry substantially congruent with that of the cross sectional geometry of the shoulder 46 to provide mating engagement therebetween. Such would obviate the need of the retainer plates 56, 84 to restrict rotational movement while allowing axial movement of the bolt 40 during assembly.

Thus it can be seen that the objects of the invention have been satisfied by the structure presented above. While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be made to the following claims.

What is claimed is:

1. A torque limiting clutch, comprising:
    an input flange;
    an output hub in forceful frictional engagement with said input flange;
    a pressure plate; and
    force generating means operatively interposed between said pressure plate and input flange for urging said output hub into said forceful frictional engagement with said input flange, said force generating means comprising a bolt engaging a precompressed spring, said bolt passing through a noncircular opening means having a perimeter engaging said bolt and precluding rotation thereof, said noncircular opening means being in a receiving means.

2. The torque limiting clutch according to claim 1, wherein said receiving means comprises an outer circumferential portion of said pressure plate.

3. A torque limiting clutch according to claim 1, wherein said receiving means comprises a retainer plate.

4. The torque limiting clutch according to claim 3, wherein said opening and a portion of said bolt received thereby have mating geometries.

5. The torque limiting clutch, according to claim 4, wherein said force generating means further comprises a cup containing said spring and receiving said bolt, said cup having a flange engaging said input flange.

6. The torque limiting clutch according to claim 4, wherein said output hub has a circumferential flange extending therefrom, said circumferential flange having friction material thereon.

7. The torque limiting clutch according to claim 6, further comprising a friction disc interposed between said retainer plate and said pressure plate, said retainer plate serving as a separator plate betweeen said friction disc and said circumferential flange.

8. The torque limiting clutch according to claim 6, wherein said input flange is received upon said output hub with a bearing interposed therebetween.

9. The torque limiting clutch according to claim 8, wherein said input flange has an external planar surface and said pressure plate has an external planar surface, said external planar surfaces defining a maximum external axial dimension of the torque limiting clutch.

10. A torque limiting clutch, comprising:
    an input flange;
    an output hub;
    a pressure plate;
    a spring and bolt assembly interengaging said input flange, output hub, and pressure plate in forceful frictional engagement; and
    means engaging said bolt of said spring and bolt assembly for preventing rotational movement of said bolt, wherein said means comprises a retainer plate received about said output hub, said retainer plate having an opening of noncircular geometry matingly receiving a portion of said bolt.

11. The torque limiting clutch according to claim 10, wherein said output hub has a circumferential flange having frictional material thereon in engagement with said input flange.

12. The torque limiting clutch according to claim 11, wherein said pressure plate engages said frictional material of said circumferential flange and said retainer plate comprises a ring.

13. The torque limiting clutch according to claim 11, further comprising a friction disc engaging said retainer plate, said retainer plate serving as a separator plate between said friction disc and said flange of said output hub.

14. The torque limiting clutch according to claim 11, wherein said input flange is received upon said output hub with a bearing interposed therebetween.

15. The torque limiting clutch according to claim 14, wherein external surfaces of said pressure plate and input hub are planar, establishing axial external limits on a physical size of the torque limiting clutch.

16. A torque limiting clutch, comprising:
an input flange;
an output hub;
a pressure plate;
a spring and bolt assembly interengaging said input flange, output hub, and pressure plate in forceful frictional engagement; and
means engaging said bolt of said spring and bolt assembly for preventing rotational movement of said bolt, wherein said means comprises an opening within said pressure plate, said opening having a non-circular geometry mating with a corresponding cross sectional geometry of said bolt.

* * * * *